US United States Patent [19]

Schnabel

[11] 3,865,761

[45] Feb. 11, 1975

[54] FLAME RETARDANT POLYURETHANE FOAM

[75] Inventor: Wilhelm J. Schnabel, Branford, Conn.

[73] Assignee: Olin Corp., New Haven, Conn.

[22] Filed: Aug. 10, 1973

[21] Appl. No.: 387,537

[52] U.S. Cl. .................... 260/2.5 AJ, 260/45.85 A
[51] Int. Cl. ...................... C08g 22/44, C08g 51/60
[58] Field of Search.... 260/2.5 AJ, 2.5 BB, 2.5 AM, 260/2.5 AT, 77.5 TB, 45.85 A

[56] References Cited
UNITED STATES PATENTS

| 3,178,490 | 4/1965 | Petrino | 260/2.5 AJ |
| 3,275,578 | 9/1966 | Pedjac | 260/2.5 AJ |
| 3,284,376 | 11/1966 | Pedjac | 260/2.5 AJ |
| 3,595,814 | 7/1971 | Lloyd | 260/2.5 AM |
| 3,650,788 | 3/1972 | Kamp | 260/77.5 TB |
| 3,689,440 | 9/1972 | Glaesmann | 260/2.5 AJ |
| 3,706,680 | 12/1972 | Booth | 260/2.5 AM |

FOREIGN PATENTS OR APPLICATIONS 994,087  6/1965  Great Britain..............260/2.5 AJ Primary Examiner—Donald E. Czaja
Assistant Examiner—C. W. Ivy
Attorney, Agent, or Firm—F. A. Iskander; T. P. O'Day

[57] ABSTRACT

Halogenated aromatic carbamates are utilized as flame retardant additives in the production of polyurethane foam.

13 Claims, No Drawings

FLAME RETARDANT POLYURETHANE FOAM

This invention relates to the production of polyurethane foam. More particularly, the invention relates to the use of a select group of halogenated carbamates as flame retardant additives for polyurethane foam.

The carbamates are a well-known group of compounds which can be prepared by condensing an organic isocyanate with an alcohol. It is also known that due to their biocidal activity, a number of halogenated aromatic carbamates are of utility as bactericides, fungicides or herbicides. See for example U.S. Pat. Nos. 2,848,328, 2,945,877, 2,951,786 and 3,024,269.

The wide range of utility of polyurethane foam has been circumscribed by its flammability. Consequently, numerous efforts have been made in recent years to develop ways of imparting flame retardant properties to the foam. These efforts have produced a variety of halogenated flame retardant additives which are generally incorporated in the foam forming formulation either alone or in combination with other materials, e.g., antimony oxide.

A critical requirement in every flame retardant additive which is to be used in polyurethane foam is that it must have no adverse effect on the foaming reaction nor materially alter the basic properties of the resulting foam. Because of this requirement, many a prior art flame retardant, although useful in other fire fighting applications, cannot be used in conjunction with the production of polyurethane foam. This is particularly the case with flexible or substantially open-celled polyurethane foam; for it is generally known that such foams are more susceptible to adverse change as a result of incorporating additive ingredients in the foam forming formulation.

Now it has been found, in accordance with the invention, that halogenated aromatic carbamates can be utilized to advantage as flame retardant additives in polyurethane foam. Along with having no adverse effect on the foaming reaction and the resulting foam, these carbamates, by virtue of their thermal dissociation characteristics, have been found to be exceptionally suited for use with polyurethane foam. Further according to the invention, increased flame retardancy is achieved by incorporating in the polyurethane foam forming formulation a co-additive mixture of a halogenated aromatic carbamate and antimony oxide or antimony oxyhalide.

The carbamates which are contemplated for use within the broad concept of the invention include any chlorine-and/or bromine-containing aromatic mono-, di-, or tricarbamate which is derived from the condensation of an aromatic compound having one, two, or three isocyanate groups with another aromatic compound having one or two hydroxy groups. However, it is generally preferred to utilize the halogenated mono- and dicarbamates represented by formulas I or II as follows:

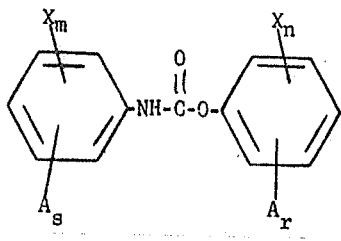

I

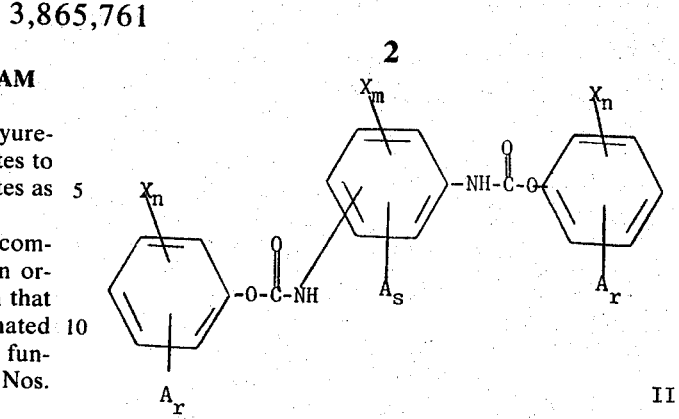

II wherein, as applied to both formulas I and II,
each A is independently an alkyl group of 1–12, preferably 1–4 carbon atoms, and still more preferably methyl,
$r$ is an integer from 0 to 3,
$s$ is an integer from 0 to 3,
each X is independently a halogen selected from chlorine and bromine,
$m$ is an integer of 0–5 as applied to formula I and 0–4 as applied to formula II, and
$n$ is an integer from 0 to 5,
with the proviso that the sum of $m + n$ is at least 1.

With reference to the variable integers $m$, $n$, $r$, and $s$ in formulas I and II, it is obvious of course that the variation of each integer within the scope given above is limited by the value of the other integer within the same benzenoid ring. For example, $n$ obviously cannot be 5 when $r$ is 1, 2, 3; conversely, $r$ can only be 0 when $n$ is 5. Thus it is to be understood that the values attributed to $m$, $n$, $r$, and $s$ in the specification and claims herein are subject to the following qualifications:

1. the sum of $n + r$ cannot be greater than 5,
2. the sum of $m + s$ in formula I cannot be greater than 5, and
3. the sum of $m + s$ in formula II cannot be greater than 4.

The halogenated aromatic mono- and dicarbamates represented by formulas I and II above, several of which are novel compounds, can be prepared by a method well known in the art wherein the appropriate aromatic mono- or diisocyanate is reacted with a substituted or unsubstituted phenol. The reaction is illustrated by one of the following two equations:

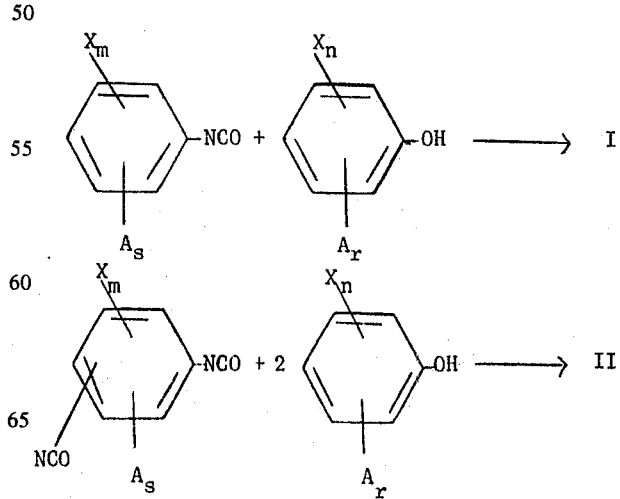

wherein A, r, s, X, m, and n have the significance indicated above. Further details concerning this type of condensation reactions are found in U.S. Pat. No. 3,024,269, the entire disclosure of which is incorporated herein by reference.

Illustrative of the phenols which may be employed in preparing the halogenated carbamates are the following:

phenol
2- or 4-chlorophenol
2- or 4-bromophenol
2,4-dichlorophenol
2,4-dibromophenol
2,4,6-trichlorophenol
2,4,6-tribromophenol
pentachlorophenol
pentabromophenol
2-, 3-, or 4-methyl phenol
4-chloro-2-methyl phenol
2,4-dichloro-6-methyl phenol
2,6-dibromo-4-methyl phenol
4-chloro-3,5-dimethyl phenol
4-isopropyl phenol
2,4-ditertiarybutyl phenol
4,n-butyl-2-chlorophenol Illustrative of the mono- and diisocyanates which may be employed in preparing the halogenated carbamates are the following:

MONOISOCYANATES phenylisocyanate
2- or 4-chlorophenylisocyanate
4-bromophenylisocyanate
2,4-dichlorophenylisocyanate
3,5-dibromophenylisocyanate
2,4,6-trichlorophenylisocyanate
2,4,6-tribromophenylisocyanate
pentachlorophenylisocyanate
4-methylphenylisocyanate
2-methyl-4-chlorophenylisocyanate
2-methyl-4-bromophenylisocyanate
4-n-butylphenylisocyanate
4-cyclohexylphenylisocyanate
4-dodecylphenylisocyanate

DIISOCYANATES toluene-2,4-diisocyanate
toluene-2,6-diisocyanate
5-chlorotoluene-2,4-diisocyanate
5-bromotoluene-2,4-diisocyanate
3-chlorotoluene-2,6-diisocyanate
3-bromotoluene-2,6-diisocyanate
3,5,6-trichlorotoluene-2,4-diisocyanate
3,4,5-trichlorotoluene-2,6-diisocyanate
phenylene-1,3-diisocyanate
phenylene-1,4-diisocyanate
4-chlorophenylene-1,3-diisocyanate
4-bromophenylene-1,3-diisocyanate
4,6-dichlorophenylene-1,3-diisocyanate
4,6-dibromophenylene-1,3-diisocyanate
4,5,6-trichlorophenylene-1,3-diisocyanate
4,5,6-tribromophenylene-1,3-diisocyanate
2,4,5,6-tetrachlorophenylene-1,3-diisocyanate
2-chlorophenylene-1,4-diisocyanate
2-bromophenylene-1,4-diisocyanate
2,5-dichlorophenylene-1,4-diisocyanate
2,5-dibromophenylene-1,4-diisocyanate
2,3,5-trichlorophenylene-1,4-diisocyanate
2,3,5-tribromophenylene-1,4-diisocyanate
2,3,5,6-tetrachlorophenylene-1,4-diisocyanate
1-cyclohexylphenylene-2,4-diisocyanate
1-secondary butylphenylene-2,4-diisocyanate
1-dodecylphenylene-2,4-diisocyanate The carbamates of formula I and II which are utilized according to the process of the invention are exemplified by the following:

MONOCARBAMATES phenylcarbamic acid-2,4,5-trichlorophenyl ester
phenylcarbamic acid-2,4,6-tribromophenyl ester
m-tolycarbamic acid-2,4,5-trichlorophenyl ester
4-bromophenylcarbamic acid 2,4,6-trichlorophenyl ester
phenylcarbamic acid-pentachlorophenyl ester
2,4,6-tribromophenylcarbamic acid-pentachlorophenyl ester
pentachlorophenylcarbamic acid-4-bromophenyl ester
2-methyl-4-bromophenylcarbamic acid-pentachlorophenyl ester
4-dodecylphenylcarbamic acid-2,4,6-tribromophenyl ester
pentachlorophenylcarbamic acid-4-chloro-3,5-dimethylphenyl ester

DICARBAMATES toluene-2,4-dicarbamic acid dipentachlorophenyl ester
toluene-2,4-dicarbamic acid dipentabromophenyl ester
5-bromotoluene-2,4-dicarbamic acid dipentachlorophenyl ester
5-bromotoluene-2,4-dicarbamic acid di-2,4,6-tribromophenyl ester
2,4,5,6-tetrachlorophenylene-1,3-dicarbamic acid dipentachlorophenyl ester
dodecylphenylene-2,4-dicarbamic acid di-2,6-dibromo-4-methyl phenyl ester
2,4,5,6-tetrachlorophenylene-1,3-dicarbamic acid 2,4-di-tert. butylphenyl ester In accordance with the more preferred embodiments of the invention, those carbamates of formulas I and II are employed wherein at least one halogen represented by X is bromine; and still more preferably wherein each of m and n is an integer of 1–5. The most preferred carbamates for use according to the invention are those of formula II in which r is 0 and s is 1.

As indicated above, in accordance with one embodiment of the invention, an antimony oxide or oxyhalide is employed as a co-additive with the halogenated aromatic carbamates in the production of flame retardant polyurethane. The antimony oxide can be antimony trioxide ($Sb_2O_3$), antimony tetraoxide ($Sb_2O_4$) or antimony pentoxide, the trioxide being preferred. The antimony oxyhalide can be antimony oxychloride or oxybromide, the oxychloride being preferred.

Pursuant to the invention, flame retardant polyurethane foam is prepared from a foam forming reaction mixture comprising a halogenated aromatic carbamates and optionally an antimony oxide or oxyhalide. In preparing the polyurethane foam, either the so-called "one-shot method" or the "prepolymer technique" may be employed. Any combination of polyols, including polyether polyols and polyester polyols, organic polyisocyanate, foaming agent, catalyst and other reactants capable of forming a polyurethane foam can be employed. Typical formulations are described in U.S. Pat. No. 3,072,582, issued Jan. 8, 1963, and Canadian Pat. No. 705,938, issued Mar. 16, 1965.

While, as indicated above, both polyether and polyester polyols can be employed in the practice of this invention, preferred embodiments utilize polyether polyols in the preparation of the polyurethane foam forming reaction mixture. Any suitable polyether polyol may be used for this purpose. These polyether polyols usually have a hydroxyl number for example from about 25 to about 800.

The polyether polyols include for example oxyalkylated polyhydric alcohols having a molecular weight range of about 200–10,000 and preferably between about 250°–8,000. These oxyalkylated polyhydric alcohols are generally prepared by methods well known in the art such as reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides, using either random or step-wise addition.

Polyhydric alcohols suitable for use in preparing the polyether polyols include glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, dextrose, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides, such as acetamide, succinamide and benzensulfonamide, constitute a further class of such reactive hydrogen compounds. A still further class of such reactive hydrogen compounds is the di- and polycarboxylic acids, such as adipic acid, succinic acid, glutaric acid, aconotic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine may also be employed. Mixtures of oxyalkylated polyhydric alcohols are also suitable for use in the process of this invention.

Although, the polyurethane foams of the invention can be flexible, semi-rigid, or rigid, the flexible foams are preferred. Therefore in preparing the polyurethane foam in accordance with this preferred embodiment of the invention, an oxylakylated polyhydric alcohol is used having a molecular weight of about 2,000–7,000 and more preferably about 2,500–6,000.

The organic polyisocyanates used in the preparation of the polyurethane foams include toluene diisocyanate, such as the 4:1 mixture of the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The preferred organic polyisocyanate is toluene diisocyanate. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index."

The polyurethane foams are prepared in the presence of a foaming agent which may be any of those known to be useful for this purpose. Illustrative are water and organic foaming agents containing up to about seven carbon atoms such as the halogenated hydrocarbons, lower molecular weight alkanes, alkanes, ethers, and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to about 50, and preferably about 5–35, parts per 100 parts by weight of the polyol, and generally water is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, such as tertiary amines and metallic salts, particularly stannous salts, and mixtures thereof. Typical tertiary amines include, but are not limited to, the following: N-ethyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalyst or catalyst mixture may be employed such as between about 0.1 and about 3.0 percent, and preferably between about 0.5 and about 2.5 percent, by weight of the polyol.

It is preferred in the preparation of the polyurethane foams of the present invention to employ minor amounts of a conventional surfactant in order to further improve the cell structure of the polyurethane foam. Typical of such surfactants are the silicones and the siloxaneoxyalkylene block copolymers. U.S. Pat. No. 2,834,748 and T. H. Ferrigno, *Rigid Plastic Foams*

(New York: Reinhold Publishing Corp., 1963) pages 38–42, disclose various surfactants which are useful for this purpose. Generally up to 2 parts by weight of the surfactant are employed per 100 parts of the polyol.

In the preparation of flame retardant polyurethane foam, the additives of the invention are usually incorporated in the polyurethane forming reaction mixture before foaming. Conveniently, they are first mixed in with the polyol reactant, and the mixture is then added to the other ingredients used to make the foam. Any suitable proportion of the additives may be used which is effective in reducing the flammability of the foam without otherwise interfering with the foaming reaction or materially altering the properties of the resulting foam. For example, the carbamates may be used in a proportion of about 5–40, and preferably about 10–35, parts per every 100 parts by weight of polyol employed in making the foam; and the proportion of the antimony co-additive, if such is used, usually ranges from about 1 to about 25, and preferably about 3–15, parts per every 100 parts by weight of total polyol, employed in making the foam.

The utilization of halogenated aromatic carbamates as flame retardants in polyurethane foam has one unique advantage which is attributed to the thermal dissociation characteristics of the carbamates. Thus these materials, while thermally stable under the conditions of the polyurethane foam forming reaction, dissociate or decompose at about 200°–250° C. This is essentially the same temperature range for the decomposition of the polyurethane foam. Consequently, when the foam begins to decompose as a result of partial inflammation, this will be accompanied by the simultaneous dissociation of the halogenated carbamate additive which is incorporated in the foam. Such dissociation results in the generation of volatile fragments, i.e., halogenated phenols and/or halogenated isocyanates, in close proximity to the flame front, which spontaneously act to subdue the flame or at least substantially reduce the burning rate.

Furthermore, the halogenated aromatic carbamate flame retardants of the invention are completely inert materials which do not interfere with polyurethane foam forming reaction and do not exert any adverse effect on the properties of the resulting foam. As such, they are particularly useful in the preparation of flame retardant flexible polyurethane foams. Such foams are of utility in various applications including the production of cushions, carpet pads, mattresses and the like.

The following examples are provided to illustrate the invention. In these examples all parts and percentages are by weight unless otherwise specified. All foams prepared in these examples were based on the same basic foam formulation which was comprised of the following ingredients in the indicated proportions:

| Ingredients | Parts by Weight |
| --- | --- |
| oxypropylated glycerin (mol. wt. 3,000) | 100.0 |
| tolylene diisocyanate (80% 2,4-, 20% 2,6-isomer) | 49.8 |
| water | 4.0 |
| stannous octoate | 0.05 |
| triethylene diamine (33% soln. in dipropylene glycol) | 0.9 |
| N-ethylmorpholine | 1.0 |
| silicone oil | 1.5 |

EXAMPLE 1

One mole of pentachlorophenol was dissolved in about 600 mls. of monochlorobenzene, and the solution was placed in a reaction flask equipped with an agitator, a thermometer, a reflux condenser and a dropping-funnel. After the addition of about 0.6 ml. of stannous octoate catalyst, the mixture was heated to about 100° C. Then one mole of 2,4,6-tribromophenylisocyanate, product of the phosgenation of 2,4,6-tribromoaniline, was added gradually over a 1-hour interval. The mixture was refluxed for about 3 hours and then left overnight at room temperature which resulted in the formation of crystals of 2,4,6-tribromophenyl carbamic acid pentachlorophenyl ester. These crystals were filtered out, washed with petroleum ether and finally dried in vacuum. The identity of the carbamate ester was confirmed by infrared spectroscopy which showed strong absorption at $3.1\mu$ and $5.75\mu$, characteristic of carbamates. Absence of absorption in the $4.4$-$4.5\mu$ region indicated no NCO groups were present and therefore that the carbamate forming reaction was complete.

Using the above-described polyurethane foam forming formulation, two foams were prepared which were identified as foam A and foam B. In preparing foam A, 20 parts of the carbamate ester prepared according to this example were incorporated in the foam forming mixture before foaming; and in preparing foam B, 20 parts of the carbamate ester and 5 parts of antimony oxychloride were included in the foam forming reaction mixture. The flammability of both foams was tested according to ASTM 1692-68. Foam A was rated "burning," but it had an average burning rate, measured in terms of inches of foam consumed by the flame per minute, of 2.1 ins./min. Foam B was found to be self-extinguishing with an extent of burn, by the time the flame was extinguished, of 3.5 ins.

A control sample of a third foam prepared from the above-described formulation with no flame retardants added was tested for flammability by the same ASTM test. It was rated burning with an average burning rate of 7 ins./min.

EXAMPLE 2

The amount of 79.2 grams (0.3 mole) of pentachlorophenol was dissolved in 200 mls. of monochlorobenzene, and the solution was placed in a reaction flask equipped with an agitator, a thermometer, a reflux condenser and a dropping-funnel. After the addition of 0.2 ml. of stannous octoate catalyst, the mixture was heated to about 100°C. Then 26.1 grams (0.15 mole) of 2,4-toluene diisocyanate were added gradually over a 1-hour interval. The reaction mixture was refluxed for 3 hours and thereafter left overnight at room temperature. Crystals of toluene-2,4-dicarbamic acid dipentachlorophenyl ester were formed, and these were recovered by filtration, washed with petroleum ether and dried in vacuum. The crystals were found to melt at 194°–196°C, and the structure of the dicarbamate in them was confirmed by infrared spectroscopy, i.e., strong infrared absorption at $3.1\mu$ and $5.8\mu$ and no absorption in the 4.4-4.5μ region indicating absence of NCO groups and completion of the reaction.

Four flexible polyurethane foams, identified as C, D, E, and F, were prepared using the basic foam forming formulation described above. In preparing foams C through E, varying amounts, as indicated in Table 1 below, of the dicarbamate prepared above and antimony trioxide or antimony oxychloride were incorporated in the foam forming reaction mixture before foaming. Foam F was a control sample based on the same formulation but to the exclusion of any dicarbamate and antimony co-additive. Each foam was tested for its resistance to burning according to the test described in ASTM 1962-68. The results are provided in Table 1 below.

Table 1

|        | Dicarbamate (PBW) | $Sb_2O_3$ (PBW) | SbOCl (PBW) | Flammability |
|--------|-------------------|-----------------|-------------|--------------|
| Foam C | 20                | none            | none        | B-2.6"/min.* |
| Foam D | 20                | 5               | none        | B-1.9"/min.  |
| Foam E | 20                | none            | 5           | B-1.4"/min.  |
| Foam F | none              | none            | none        | B-7"/min.    |

*B indicates that the foam was rated as burning; 2.6"/min. indicates the average rate of burning measured in terms of inches of foam consumed by the flame per minute.

EXAMPLE 3

Pentabromophenol (0.3 mole) was dissolved in 200 mls. of monochlorobenzene and thereafter reacted with 0.15 mole of 2,4-tolylene diisocyanate following the procedure used in Example 2. Crystalline toluene-2,4-dicarbamic acid dipentabromophenyl ester was recovered and it had a melting point of 180°-181° C. Identity of the carbamate product and completion of the reaction were confirmed by infrared spectroscopy as used in Example 2.

A flexible polyurethane foam was prepared incorporating 20 parts of this carbamate and 5 parts of antimony oxychloride. The foam was found to be self-extinguishing, under ASTM 1692-68, with a 2.7 ins. burn extent.

EXAMPLE 4

The procedure of Example 3 was used to react 5-bromotolylene-2,4-diisocyanate with pentachlorophenol and form the corresponding dicarbamic acid ester, i.e., 5-bromotolylene-2,4-dicarbamic acid dipentachlorophenyl ester, the identity of which was again confirmed by infrared spectroscopy. A flexible polyurethane incorporating 20 parts of this ester and 5 parts of antimony oxychloride was found to be self-extinguishing with a 3.3 ins. burn extent.

What is claimed is:

1. A process for preparing a flexible polyurethane foam from a reaction mixture which comprises a polyol, an organic polyisocyanate, a foaming agent, a reaction catalyst and a flame retarding amount of a halogenated aromatic carbamate represented by formula I or formula II as follows:

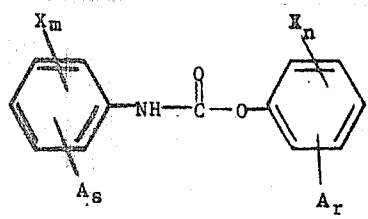

I

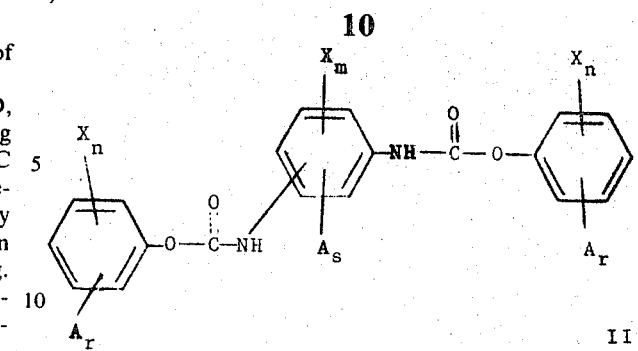

II wherein, as applied to each of said formulas I and II;
each A is independently an alkyl group of 1-12 carbon atoms,
r is an integer from 0 to 3,
s is an integer from 0 to 3,
each X is independently a halogen selected from chlorine and bromine,
m is an integer of 0-5 as applied to said formula I and 0-4 as applied to said formula II, and
n is an integer from 0 to 5,
with the proviso that the sum of $m + n$ is at least 1.

2. The process of claim 1 wherein A in an alkyl group having 1-4 carbon atoms.

3. The process of claim 2 wherein at least one halogen represented by X is bromine.

4. The process of claim 3 wherein A is methyl.

5. The process of claim 4 wherein said reaction mixture also comprises antimony oxide or antimony oxyhalide.

6. The process of claim 5 wherein said antimony oxide is antimony trioxide and said antimony oxyhalide is antimony oxychloride.

7. The process of claim 6 wherein said polyol is an oxyalkylated polyhydric alcohol having a molecular weight of about 2,000-7,000.

8. The process of claim 7 wherein said organic polyisocyanate is toluene diisocyanate.

9. The process of claim 8 wherein said flame retarding amount ranges from about 5 to about 40 parts per every 100 parts by weight of said polyol, and wherein said reaction mixture comprises about 1-25 parts of said antimony oxychloride per every 100 parts by weight of said polyol.

10. The process of claim 7 wherein said halogenated aromatic carbamate is selected from the group consisting of 2,4,6-tribromophenyl carbamic acid pentachlorophenyl ester, toluene-2,4-dicarbamic acid dipentabromophenyl ester, and 5-bromotoluene-2,4-dicarbamic acid dipentachlorophenyl ester.

11. The process of claim 10 wherein said reaction mixture also comprises a surfactant.

12. The process of claim 11 wherein said oxyalkylated polyhydric alcohol is oxypropylated glycerin.

13. The process of claim 12 wherein said flame retarding amount ranges from about 10 to about 35 parts and said antimony oxychloride is used in a proportion of about 3-15 parts per every 100 parts by weight of said polyol.

* * * * *